UNITED STATES PATENT OFFICE.

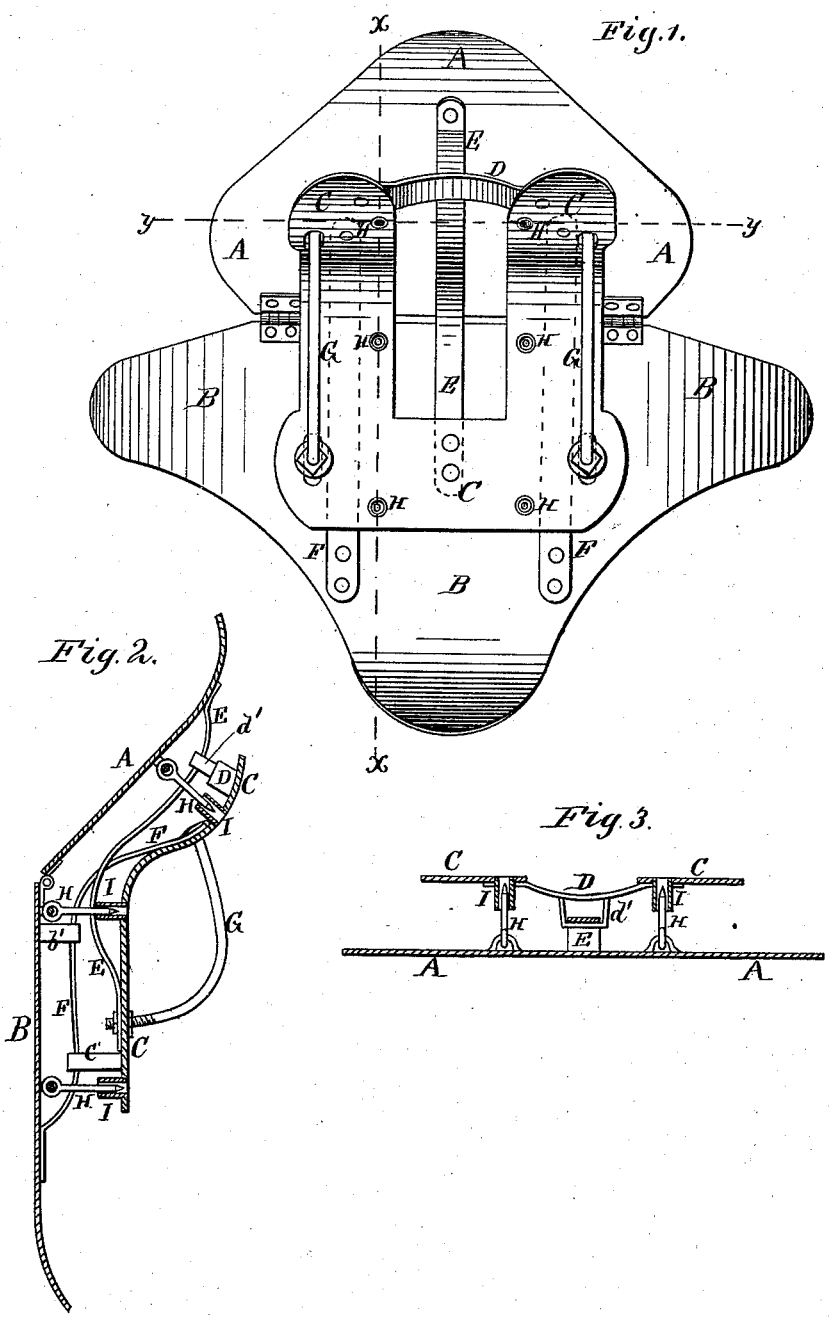

DAVID S. LUDLUM, OF NEW HAMPTON, NEW YORK, AND LOUIS W. LUDLUM, OF ORANGE, NEW JERSEY.

IMPROVEMENT IN HAMPERS.

Specification forming part of Letters Patent No. 198,805, dated January 1, 1878; application filed November 22, 1877.

*To all whom it may concern:*

Be it known that we, DAVID SWEZEY LUDLUM, of New Hampton, in the county of Orange and State of New York, and LOUIS WELLS LUDLUM, of Orange, in the county of Essex and State of New Jersey, have invented a new and useful Improvement in Hampers, or devices for preventing horned cattle from throwing fences or goring, of which the following is a specification:

Referring to the accompanying drawings, forming part of this specification, Figure 1 is a rear view of our improved device. Fig. 2 is a longitudinal section of the same, taken through the line $x\ x$, Fig. 1. Fig. 3 is a cross-section of the same, taken through the line $y\ y$, Fig. 1.

Similar letters of reference indicate corresponding parts.

The object of this invention is to furnish an improved hamper for attachment to the foreheads of cattle, to prevent them from goring, and from pushing and throwing down fences with their horns, and which shall be simple in construction, easily applied, and effective in use.

The invention consists in a hamper for cattle, made of an outer plate and an inner plate formed to suit the angles of the animal's head and horns; in a hamper for cattle, made of an outer plate and an inner plate, formed to suit the angles of the animal's head and horns, kept a short distance apart by springs, and held together and in place by flexible stays; in a hamper for cattle, made of an outer plate and an inner plate, formed to suit the angles of the animal's head and horns, kept a short distance apart by springs, held together and in place by stays, and having the upper plate armed with hinged points, conducted through the lower plate to come in contact with the head when any attempt is made to use the horns; and in the hamper formed by the combination of the hinged plates, the curved and slotted plate, the strap, the springs, the bent rods, the hinged pins, and the guide-tubes with each other, as hereinafter fully described.

A and B are two plates, made in the general form of triangles, with their angles rounded off, and which are hinged together at their longer sides. The lower and larger plate B has its lower sides concaved, its side angles curved outward, and its lower angle curved inward. The upper and smaller plate A has its upper angle curved outward.

C is a third plate, which is curved to fit upon the ridge between the horns of the animal, and has a wide slot formed in it, extending from its upper edge nearly to its lower edge.

The parts of the upper end of the plate C are connected by a metal strap, D, which is slightly curved, to fit upon the neck of the animal at the base of the horns, and upon its middle part is formed a stay, $d'$, through which passes the spring E. The upper end of the spring E is attached to the upper middle part of the plate A, and its lower end is attached to the lower middle part of the plate C.

F are two springs, the lower ends of which are attached to the lower part of the plate B, a little below the end parts of the lower edge of the plate C. The springs F pass through stays $c'$, attached to the lower part of the plate C, through stays $b'$, attached to the upper part of the plate B, and their upper ends are attached to the upper parts of the plate C.

G are curved stays, which pass through elongated holes in the upper and lower side parts of the plate C, and are secured to the said plate, detachably and adjustably, by nuts. The stays G are designed to be passed around the bases of the horns, to secure the device in place, the said horns passing through the angle between the side parts of the plates A B.

H are pointed pins, which are hinged to the plates A B, and pass through short guide-tubes I, secured in holes in the plate C.

With this construction, should the animal to which the device is attached attempt to gore, or to push or throw down a fence, or to do other mischief with his horns or head, the pressure against the plates A B will cause the pointed pins H to project through the holes in the plate C and prick him, so that he cannot do any mischief, and will soon desist from attempting it.

The shape and size of the plates A B C may be varied according to the shape and size of the head of the animal to which the device is to be applied, and according to the shape and direction of his horns.

Having thus described our invention, we claim as new and desire to secure by Letters Patent—

1. A hamper for cattle, made of outer plates A B, hinged to each other, and an inner plate, C, formed to suit the angles of the animal's head and horns, substantially as herein shown and described.

2. A hamper for cattle, made of outer plates A B, hinged to each other, and an inner plate, C, formed to suit the angles of the animal's head and horns, kept a short distance apart by springs E F, and held together and in place by flexible stays $d'$ $b'$ $c'$, substantially as herein shown and described.

3. A hamper for cattle, made of outer plates A B, hinged to each other, and an inner plate, C, formed to suit the angles of the animal's head and horns, kept a short distance apart by springs E F, held together and in place by stays $d'$ $b'$ $c'$, and having the upper plate A B armed with hinged points H, conducted through the lower plate C, to come in contact with the head when any attempt is made to use the horns, substantially as herein shown and described.

4. The hamper formed by the combination of the hinged plates A B, the curved and slotted plate C, the strap D, the springs E F, the bent stays G, the hinged pins H, and the guide-tubes I with each other, substantially as herein shown and described.

DAVID SWEZEY LUDLUM.
LOUIS WELLS LUDLUM.

Witnesses for D. S. Ludlum:
JAMES T. GRAHAM,
C. SEDGWICK.

Witnesses for L. W. Ludlum:
GEORGE H. HARTFORD,
JAS. B. HAMILTON.